United States Patent
Lee et al.

(10) Patent No.: US 11,383,268 B2
(45) Date of Patent: Jul. 12, 2022

(54) SURFACE-TREATED METALLIC MATERIAL WITH EASY CONTROL OF GLOSSINESS AND MANUFACTURING METHOD THEREFOR

(71) Applicant: POSCO, Pohang-si (KR)

(72) Inventors: Jung-Hwan Lee, Gwangyang-si (KR); Ha-Na Choi, Gwangyang-si (KR); Jin-Tae Kim, Gwangyang-si (KR); Yon-Kyun Song, Gwangyang-si (KR); Bong-Woo Ha, Gwangyang-si (KR)

(73) Assignee: POSCO, Pohang-si (KR)

( * ) Notice: Subject to any disclaimer, the term of this patent is extended or adjusted under 35 U.S.C. 154(b) by 942 days.

(21) Appl. No.: 15/779,689

(22) PCT Filed: Nov. 23, 2016

(86) PCT No.: PCT/KR2016/013560
§ 371 (c)(1),
(2) Date: May 29, 2018

(87) PCT Pub. No.: WO2017/095067
PCT Pub. Date: Jun. 8, 2017

(65) Prior Publication Data
US 2020/0306793 A1    Oct. 1, 2020

(30) Foreign Application Priority Data
Nov. 30, 2015    (KR) .................. 10-2015-0168748

(51) Int. Cl.
*B05D 5/02*    (2006.01)
*C09D 5/00*    (2006.01)
(Continued)

(52) U.S. Cl.
CPC .............. *B05D 5/02* (2013.01); *B05D 3/067* (2013.01); *B05D 7/14* (2013.01); *C09D 5/00* (2013.01);
(Continued)

(58) Field of Classification Search
CPC ... B05D 1/02; B05D 1/26; B05D 5/02; B05D 5/06; B05D 3/067; B05D 7/14;
(Continued)

(56) References Cited

U.S. PATENT DOCUMENTS 6,759,096 B2 *   7/2004   MacQueen .............. D06N 3/06
                                                          427/500
2002/0168501 A1 * 11/2002 Sigel ...................... B05D 5/061
                                                          428/195.1
(Continued)

FOREIGN PATENT DOCUMENTS

EP   2813372      12/2014
JP   2000158599   6/2000
(Continued)

OTHER PUBLICATIONS

European Search Report—European Application No. 16870963.2, dated Nov. 23, 2018, citing US 2009/225143, WO 2016/142510, US 2013/278672, EP 2 813 372, US 2014/196618, US 2006/198964 and KR 101 500 236.
(Continued)

*Primary Examiner* — Sanza L. McClendon
(74) *Attorney, Agent, or Firm* — Cantor Colburn LLP

(57) ABSTRACT

Provided is a surface-treated metallic material with easy control of glossiness and a manufacturing method therefor, the surface-treated metallic material comprising: a metallic material; and a coating layer which is formed on at least one side of the metallic material and on which an ultraviolet curable coating composition is cured, wherein the coating
(Continued)

layer consists of a plurality of protrusions, which have a volume of 3 to 16 pico liters and are arranged at a density of 5 to 610 per 1 mm² of the metallic material. As such, the surface-treated steel sheet is excellent in adhesion, scratch resistance and corrosion resistance, and has easy control of glossiness.

10 Claims, 1 Drawing Sheet

(51) Int. Cl.
    *B05D 3/06*     (2006.01)
    *B05D 7/14*     (2006.01)
    *C08F 220/18*     (2006.01)
    *C08F 222/10*     (2006.01)
    *C09D 4/00*     (2006.01)
    *C08F 220/68*     (2006.01)

(52) U.S. Cl.
    CPC ...... *B05D 2202/15* (2013.01); *B05D 2502/00* (2013.01); *C08F 220/1805* (2020.02); *C08F 220/1811* (2020.02); *C08F 220/68* (2013.01); *C08F 222/1061* (2020.02); *C08F 222/1065* (2020.02); *C09D 4/00* (2013.01); *Y10T 428/24917* (2015.01)

(58) Field of Classification Search
    CPC ............ B05D 2202/15; B05D 2502/00; C08F 220/1805; C08F 220/1811; C08F 220/68; C08F 222/1061; C08F 222/1065; C09D 4/00; C09D 5/00; Y10T 428/24917
    See application file for complete search history.

(56) References Cited

U.S. PATENT DOCUMENTS

| | | | |
|---|---|---|---|
| 2004/0241416 A1* | 12/2004 | Tian | B44C 5/0461 428/161 |
| 2006/0198964 A1 | 9/2006 | Kaiser | |
| 2009/0225143 A1 | 9/2009 | Fukui | |
| 2013/0278672 A1 | 10/2013 | Tsai et al. | |
| 2014/0196618 A1 | 7/2014 | Pervan et al. | |
| 2017/0073547 A1* | 3/2017 | Ogawa | H01L 21/6836 |
| 2018/0056671 A1 | 3/2018 | Boniface | |
| 2020/0031152 A1* | 1/2020 | Nishizawa | B05D 3/067 |

FOREIGN PATENT DOCUMENTS

| | | | |
|---|---|---|---|
| JP | 2010240922 | | 10/2010 |
| JP | 2010240922 A | * | 10/2010 |
| JP | 2012206367 | | 10/2012 |
| KR | 20130073545 | | 7/2013 |
| KR | 20140082212 | | 7/2014 |
| KR | 101500194 | | 3/2015 |
| KR | 101500195 | | 3/2015 |
| KR | 101500236 | | 3/2015 |
| WO | 2016142510 | | 9/2016 |

OTHER PUBLICATIONS

International Search Report—PCT/KR2016/013560 dated Feb. 21, 2017.

* cited by examiner

SURFACE-TREATED METALLIC MATERIAL WITH EASY CONTROL OF GLOSSINESS AND MANUFACTURING METHOD THEREFOR

TECHNICAL FIELD

The present disclosure relates to a surface-treated metallic material having ease of glossiness control and a manufacturing method therefor.

BACKGROUND ART

In general, unlike thermosetting paint, ultraviolet curable paint does not contain a solvent, but contains a substance having a low molecular weight, such as a monomer or an oligomer, and is rapidly curable using ultraviolet light. A thermosetting polymer paint containing a solvent is characterized in that since it has a low intermolecular bonding density (that is, a degree of cross-linking), a coating film has a low degree of hardness and is easily damaged by external friction. On the other hand, an ultraviolet curable paint is characterized in that since it is combined at a high degree of cross-linking, a coating film has high hardness, very good scratch resistance and image clarity, and significantly high gloss.

In recent years, as products in the field of home appliances and building materials have become more sophisticated, a paint-coated steel sheet requires aesthetic characteristics such as glossiness and image clarity, as well as required basic characteristics such as corrosion resistance, workability, chemical resistance, and the like. Further, scratch resistance, and the like, for ensuring durability after transportation and installation of products are required at the same time. Even though ultraviolet curable paint is a coating paint meeting these requirements, it is difficult to satisfy various conditions for appearance. For example, the paint of home appliances such as washing machines, refrigerators, TVs, and the like, is required to have higher glossiness and image clarity than conventional thermosetting paints, whereas an indoor panel, a building exterior material, and some home appliances require a very low level of glossiness and excellent scratch resistance.

In order to control glossiness of a steel sheet that is surface-treated with a conventional ultraviolet curable paint, a quencher and a dispersant such as silica, alumina, a synthetic polymer particle, or the like, are added to control glossiness. However, since the glossiness required depending on the type of product varies, a content of a quencher and a dispersant should be controlled in each case, increasing test costs. In addition, basic physical properties of a coating film such as corrosion resistance, coating film adhesion, and workability are influenced, causing a problem in which deviations in physical properties for each product increase.

On the other hand, a method for attaching the film having irregularities on a surface to an upper part of a coating layer, followed by ultraviolet curing, and then peeling the film off, thereby controlling glossiness of a steel sheet through irregularities of the film, has also been proposed. However, it is necessary to select a film according to a quenching effect, and when the film is used once, the film may not be reusable, which is uneconomical.

DISCLOSURE

Technical Problem

An aspect of the present disclosure is to provide a surface-treated metallic material having ease of glossiness control capable of being excellent in terms of adhesion, scratch resistance and corrosion resistance and having ease of glossiness control, and a manufacturing method therefor.

Technical Solution

According to an aspect of the present disclosure, a surface-treated metallic material having ease of glossiness control includes: a metallic material; and a coating layer, formed on at least one side of the metallic material and on which an ultraviolet curable coating composition is cured, wherein the coating layer consists of a plurality of protrusions, and the protrusion has a volume of 3 to 16 pico liters and is arranged at a density of 5 to 610 per 1 $mm^2$ of the metallic material.

The ultraviolet curable coating composition may include 40 to 70 wt % of an oligomer, 20 to 59 wt % of a photopolymerizable monomer, and 1 to 10 wt % of a photoinitiator.

The oligomer may be at least one selected from the group consisting of urethane acrylate, epoxy acrylate, and polyester acrylate.

The metallic material may be one selected from the group consisting of a cold-rolled steel sheet, a hot-dip galvanized steel sheet, an electronic galvanized sheet steel, an aluminum-plated steel sheet, an aluminum alloy-plated steel sheet, a stainless steel sheet, an aluminum sheet, a magnesium sheet, a zinc sheet, and a titanium zinc sheet.

According to another aspect of the present disclosure, a method for manufacturing a surface-treated metallic material having ease of glossiness control includes: forming a coating layer consisting of a plurality of protrusions by spraying an ultraviolet curable coating composition onto an upper part of a metallic material, wherein the protrusion has a volume of 3 to 16 pico liters and is arranged at a density of 5 to 610 per 1 $mm^2$ of the metallic material.

The method may further include: performing ultraviolet curing on the coating layer.

The ultraviolet curing may be performed for 0.1 to 60 seconds.

The spraying may be performed using at least one selected from the group consisting of an inkjet head, a spray gun, and an ultrasonic jetting device.

The ultraviolet curable coating composition may include 40 to 70 wt % of an oligomer, 20 to 59 wt % of a photopolymerizable monomer, and 1 to 10 wt % of a photoinitiator.

The oligomer may be at least one selected from the group consisting of urethane acrylate, epoxy acrylate, and polyester acrylate.

The metallic material may be one selected from the group consisting of a cold-rolled steel sheet, a hot-dip galvanized steel sheet, an electronic galvanized sheet steel, an aluminum-plated steel sheet, an aluminum alloy-plated steel sheet, a stainless steel sheet, an aluminum sheet, a magnesium sheet, a zinc sheet, and a titanium zinc sheet.

Advantageous Effects

As set forth above, according to an exemplary embodiment in the present disclosure, the surface-treated steel sheet may be excellent in terms of adhesion, scratch resistance and corrosion resistance, and may have ease of glossiness control. The surface-treated steel sheet manufacturing method of the present disclosure may provide a method for manufacturing a surface-treated steel sheet excellent in terms of adhesion, scratch resistance and corrosion resistance, and also may have an effect of easily controlling the glossiness of the steel sheet.

BEST MODE FOR INVENTION

Exemplary embodiments of the present disclosure will now be described in detail with reference to the accompanying drawings. The disclosure may, however, be embodied in many different forms and should not be construed as being limited to the embodiments set forth herein.

Conventionally, in order to control glossiness of a surface-treated metallic material, the glossiness is controlled by including a quencher in a coating composition. However, since a glossiness required depending on type of product varies, a content of the quencher should be controlled in each case, causing a problem in which test costs increase. In addition, a method for controlling gloss a metallic material by attaching a film having irregularities on a surface to a coating layer is used, but it is necessary to select a film according to the glossiness required depending on type of product, and when the film is once used, the film is not reusable, which is uneconomical.

On the other hand, the present disclosure may provide a surface-treated metallic material having ease of glossiness control without using a coating composition including a quencher and a film having irregularities, and a manufacturing method therefor.

According to an exemplary embodiment in the present disclosure, a surface-treated metallic material having ease of glossiness control may include a metallic material; and a coating layer, formed on at least one side of the metallic material and on which an ultraviolet curable coating composition is cured, wherein the coating layer consists of a plurality of protrusions, and the protrusion has a volume of 3 to 16 pico liters and is arranged at a density of 5 to 610 per 1 $mm^2$ of the metallic material.

Figure 1:
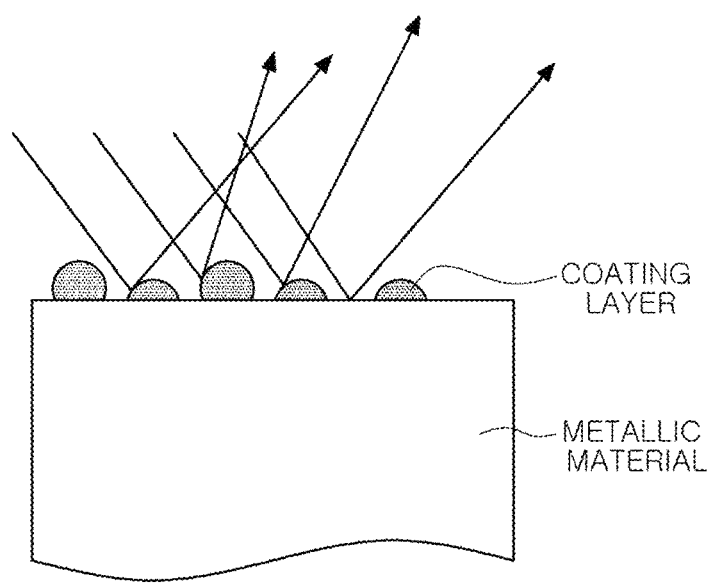
FIG. 1 schematically illustrates a cross-section of a surface-treated metallic material according to an exemplary embodiment in the present disclosure.

FIG. 1 schematically illustrates a cross-section of a surface-treated metallic material according to an exemplary embodiment in the present disclosure. As shown in FIG. 1, the surface-treated metallic material of the present disclosure may include the metallic material and the coating layer formed on one side of the metallic material, and the coating layer may consist of a plurality of protrusions. In the coating layer consisting of the plurality of protrusions, even if light enters in one direction, diffused reflection in which the light scatters in various directions may be generated. As the diffused reflection is largely generated in the coating layer, a quenching effect of the coating layer may be excellent.

The plurality of protrusions formed after the coating composition is landed on a surface of a steel sheet in the form of droplets may have a volume of 3 to 16 pico liters and may be arranged at a density of 5 to 610 per 1 $mm^2$ of the metallic material, thereby facilitating control of the glossiness of the surface-treated metallic material.

The volume of the protrusion may be 3 to 16 pico liters, preferably 3 to 13 pico liters, and more preferably 3 to 5 pico liters. When the volume of the protrusion is less than 3 pico liters, a size of the droplet may be significantly small, such that it may be difficult to form the protrusion due to severe interference with external air flow at the time of spraying, and even if the protrusion is formed, an effect of light diffused reflection is small. Meanwhile, when the volume of the protrusion is more than 16 pico liters, the size of the protrusion is large, such that a quenching effect due to the light diffuse reflection may be small. When a predetermined number or more of droplets are sprayed, the protrusions may be aggregated, such that it is difficult to expect the effect of light diffused reflection.

Meanwhile, the protrusion may be arranged at a density of 5 to 610 per 1 $mm^2$, and more preferably 57 to 608 per 1 $mm^2$ of the metallic material. When the density of the protrusion is less than 5, the number of protrusions is significantly small, such that it is difficult to exhibit the effect of light diffused reflection. When the density of protrusion is more than 610, the effect of diffuse reflection is reduced by an overlap phenomenon between the protrusions due to the large number of protrusions.

The coating layer formed on at least one side of the metallic material may be formed by curing an ultraviolet curable coating composition, and the ultraviolet curable coating composition includes an oligomer, a photopolymerizable monomer, and a photoinitiator, but does not include a quencher for controlling gloss.

In the related art, the glossiness is controlled by using an ultraviolet curable paint including a quencher. However, since the glossiness required depending on kind of a product varies, a content of the quencher should be controlled each time, causing a problem in which test costs are increased. However, since the ultraviolet curable coating composition of the present disclosure does not generally include a quencher such as silica, alumina, a synthetic polymer powder, a ceramic powder, or the like, included in the ultraviolet curable paint, the content of the quencher may not be required to be controlled according to the type of product, and a problem in which a deviation in physical properties due to the control of the content of the quencher occurs may be prevented.

In other words, according to the present disclosure, the ultraviolet curable coating composition that does not include the quencher may be used, and in the coating layer consisting of the plurality of protrusions, the volume and density of the protrusion may be controlled to control the glossiness, thereby preventing problems caused by the method for controlling the glossiness according to the related art.

The ultraviolet curable coating composition of the present disclosure may include an oligomer, a photopolymerizable monomer, and a photoinitiator. The oligomer may be at least one selected from the group consisting of urethane acrylate, epoxy acrylate, and polyester acrylate. A content of the oligomer may be 40 to 70 wt %. When the content of the oligomer is less than 40 wt %, basic physical properties required in a surface-treated steel sheet may not be satisfied, and when the content of the oligomer is more than 70 wt %, viscosity may increase to deteriorate workability, and in particular, droplet spraying may not be easy.

Meanwhile, the photopolymerizable monomer may be a monofunctional monomer, a bifunctional monomer or a polyfunctional monomer, and a content of the photopolymerizable monomer may be 20 to 59 wt %. When the content of the photopolymerizable monomer is less than 20 wt %, the droplet spraying with a high viscosity solution may not be easy. When the content of the photopolymerizable monomer is more than 59 wt %, it is difficult to implement overall physical properties.

The photoinitiator may be a short-wavelength or long-wavelength photoinitiator such as epoxy ketone, phenyl ester, or the like, and a content of the photoinitiator may be 1 to 10 wt %. When the content of the photoinitiator is less than 1 wt %, initiation due to ultraviolet light may be weak, such that an overall curing reaction does not occur, and a possibility that the coating layer is not cured is high. When the content of the photoinitiator is more than 10 wt %, crack of the coating film may be caused since excessive curing may occur, and it is economically disadvantageous since a large amount of an expensive initiator is used. Examples of the polymerization initiator may include compounds such as benzophenone-based, benzoin, benzoin ether-based, benzyl ketal-based, acetophenone-based, anthraquinone-based, and thioxanthone-based, and the like. These may be used alone or in combination of two or more, but are not limited thereto. An example of commercially available polymerization initiator may include at least one selected from the group consisting of Irgacure 184™, 754™, 819™, Darocur 1173™, TPO™ (CIBA GEIGY, Inc.), Micure CP-4™, MP-8™, BP™, TPO™ (Miwon Commercial Co., Ltd.), but is not limited thereto.

The metallic material may be one selected from the group consisting of a cold-rolled steel sheet, a hot-dip galvanized steel sheet, an electronic galvanized sheet steel, an aluminum-plated steel sheet, an aluminum alloy-plated steel sheet, a stainless steel sheet, an aluminum sheet, a magnesium sheet, a zinc sheet, and a titanium zinc sheet.

According to another exemplary embodiment of the present disclosure, a method for manufacturing a surface-treated metallic material having ease of glossiness control may be provided.

The method for manufacturing a surface-treated metallic material may include: forming a coating layer consisting of a plurality of protrusions by spraying an ultraviolet curable coating composition onto an upper part of a metallic material, wherein the protrusion has a volume of 3 to 16 pico liters and is arranged at a density of 5 to 610 per 1 $mm^2$ of the metallic material.

In the present disclosure, the coating layer may be formed by spraying an ultraviolet curable coating composition onto the upper part of the metallic material. The spraying may be performed using at least one selected from the group consisting of an inkjet head, a spray gun, and an ultrasonic jetting device.

When the ultraviolet curable coating composition is sprayed on the upper part of the metallic material using an inkjet head, first, the ultraviolet curable coating composition may be injected into a nozzle connected to each head of an inkjet printing device including at least one head. Then, the ultraviolet curable coating composition injected into the nozzle may be sprayed onto the surface of the steel sheet through the head. In the present disclosure, when the ultraviolet curable coating composition is sprayed, the coating composition is landed on the surface of the steel sheet in the form of droplets, thereby forming the coating layer consisting of the plurality of protrusions.

Unlike a thermosetting paint, since the ultraviolet curable coating composition may be rapidly cured using ultraviolet light since it does not contain a solvent. In addition, since the ultraviolet curable coating composition includes a substance having a lower molecular weight than that of the thermosetting paint, it is combined at a high degree of cross-linking, such that a coating film may have high hardness, excellent scratch resistance, significantly high gloss, and excellent image clarity.

Therefore, the ultraviolet curable coating composition is used in a product requiring higher gloss and image clarity than those of the thermosetting paint. However, since the glossiness required depending on type of product varies, the present disclosure may control the glossiness by controlling the volume and density of the protrusions in the coating layer consisting of the plurality of protrusions.

The plurality of protrusions formed after the coating composition is landed on a surface of a steel sheet in the form of droplets may have a volume of 3 to 16 pico liters and may be arranged at a density of 5 to 610 per 1 $mm^2$ of the metallic material, thereby facilitating control of the glossiness of the surface-treated metallic material.

The volume of the protrusion may be 3 to 16 pico liters, preferably 3 to 13 pico liters, and more preferably 3 to 5 pico liters. When the volume of the protrusion is less than 3 pico liters, a size of the droplet is significantly small, such that it is difficult to form the protrusion due to severe interference with external air flow at the time of spraying, and even if the protrusion is formed, an effect of diffused reflection of light is small. Meanwhile, when the volume of the protrusion is more than 16 pico liters, the size of the protrusion is large, such that a quenching effect due to the light diffuse reflection may be small. When a predetermined number or more of droplets are sprayed, the protrusions may be aggregated, such that it is difficult to expect the effect of light diffused reflection.

Meanwhile, the protrusion may be arranged at a density of 5 to 610 per 1 $mm^2$, and more preferably 57 to 608 per 1 $mm^2$ of the metallic material. When the density of the protrusion is less than 5, the number of protrusions is significantly small, such that it is difficult to exhibit the effect of light diffused reflection. When the density of protrusion is more than 610, the effect of diffuse reflection is reduced by an overlap phenomenon between the protrusions due to the large number of protrusions.

The ultraviolet curable coating composition may be sprayed on the upper part of the metallic material to form the coating layer, and then the coating layer may be subjected to ultraviolet curing. The ultraviolet curing may be performed for 0.1 to 60 seconds. When a time for performing the ultraviolet curing is less than 0.1 second, the photoinitiator may not be irradiated with sufficient ultraviolet light, such that the coating layer may be uncured, and when the time is more than 60 seconds, physical properties of the coating film may be deteriorated due to overcuring and overheating.

The ultraviolet curable coating composition sprayed on the upper part of the metallic material may include 40 to 70 wt % of the oligomer, 20 to 59 wt % of the photopolymerizable monomer, and 1 to 10 wt % of the photoinitiator. The oligomer may be at least one selected from the group consisting of urethane acrylate, epoxy acrylate, and polyester acrylate. A content of the oligomer may be 40 to 70 wt %. When the content of the oligomer is less than 40 wt %, basic physical properties required in a surface-treated steel sheet may not be satisfied, and when the content of the oligomer is more than 70 wt %, viscosity may increase to deteriorate workability, and in particular, droplet spraying may not be easy.

Meanwhile, the photopolymerizable monomer may be a monofunctional monomer, a bifunctional monomer or a polyfunctional monomer, and a content of the photopolymerizable monomer may be 20 to 59 wt %. When the content of the photopolymerizable monomer is less than 20 wt %, the droplet spraying with a high viscosity solution may not be easy. When the content of the photopolymerizable monomer is more than 59 wt %, it is difficult to implement overall physical properties.

The photoinitiator may be a short-wavelength or long-wavelength photoinitiator such as epoxy ketone, phenyl ester, or the like, and a content of the photoinitiator may be 1 to 10 wt %. When the content of the photoinitiator is less than 1 wt %, initiation due to ultraviolet light may be weak, such that an overall curing reaction may not occur, and a possibility that the coating layer is not cured is high. When the content of the photoinitiator is more than 10 wt %, excessive curing may occur, which may cause cracking of the coating film, and economically disadvantageous because a large amount of an expensive initiator is used.

The metallic material onto which the ultraviolet curable coating composition is sprayed is not particularly limited in view of type, but for example, the metallic material may be one selected from the group consisting of a cold-rolled steel sheet, a hot-dip galvanized steel sheet, an electronic galvanized sheet steel, an aluminum-plated steel sheet, an aluminum alloy-plated steel sheet, a stainless steel sheet, an aluminum sheet, a magnesium sheet, a zinc sheet, and a titanium zinc sheet.

MODE FOR INVENTION

Hereinafter, the present disclosure will be described in detail. The following Example is described for illustrative purposes only and is not to be construed as limiting the scope of the present disclosure.

EXPERIMENTAL EXAMPLE

An ultraviolet curable coating composition consisting of 20 wt % of a 6-functional polyester acrylate oligomer, 25 wt % of a bifunctional urethane acrylate oligomer, 20 wt % of tetrahydrofurfuryl acrylate (THFA), 30 wt % of isobonyl acrylate, and 5 wt % of RUNTECURE 1103 was injected into nozzles connected to each head of an inkjet printing device. The coating composition injected into the nozzles was sprayed on an upper part of a stainless steel sheet through the head. The coating composition sprayed on the upper part of the steel sheet landed on a surface of the steel sheet as droplets to form a coating layer consisting of a plurality of protrusions. The coating layer was ultraviolet cured for 30 seconds, then a glossiness was measured by a gloss meter based on 60 degrees, and a coating film adhesion was tested. A volume, a density, coating film adhesion, and glossiness of the protrusion are shown in Table 1 below.

TABLE 1

| | Volume of Protrusion (pico liter) | Density of Protrusion (number/mm$^2$) | Coating Film Adhesion | Glossiness (Based on 60 degrees) |
|---|---|---|---|---|
| Comparative Example 1 | 0 | 0 | ◯ | 177 |
| Comparative Example 2 | 3 | 3 | ◯ | 170 |
| Example 1 | 3 | 57 | ◯ | 145 |
| Example 2 | 3 | 123 | ◯ | 132 |
| Example 3 | 3 | 186 | ◯ | 116 |
| Example 4 | 3 | 238 | ◉ | 108 |
| Example 5 | 3 | 295 | ◉ | 96 |
| Example 6 | 3 | 366 | ◉ | 91 |
| Example 7 | 3 | 423 | ◉ | 101 |
| Example 8 | 3 | 486 | ◉ | 110 |
| Example 9 | 3 | 551 | ◉ | 122 |
| Example 10 | 3 | 608 | ◉ | 125 |
| Comparative Example 3 | 3 | 705 | ◉ | 163 |
| Comparative Example 4 | 5 | 3 | ◯ | 168 |
| Example 11 | 5 | 63 | ◉ | 142 |
| Example 12 | 5 | 124 | ◉ | 130 |
| Example 13 | 5 | 268 | ◉ | 95 |
| Example 14 | 5 | 486 | ◉ | 120 |
| Comparative Example 5 | 5 | 680 | ◉ | 171 |
| Comparative Example 6 | 13 | 3 | ◯ | 175 |
| Example 15 | 13 | 62 | ◯ | 128 |
| Example 16 | 13 | 132 | ◉ | 121 |
| Example 17 | 13 | 179 | ◉ | 116 |
| Example 18 | 13 | 235 | ◉ | 108 |
| Example 19 | 13 | 302 | ◉ | 125 |
| Comparative Example 7 | 13 | 620 | ◉ | 175 |
| Comparative Example 8 | 16 | 3 | ◯ | 153 |
| Example 20 | 16 | 5 | ◯ | 116 |
| Example 21 | 16 | 10 | ◉ | 120 |
| Example 22 | 16 | 20 | ◉ | 116 |
| Example 23 | 16 | 10 | ◉ | 110 |

As shown in Table 1, it was confirmed that Examples 1 to 24 in which the protrusion had a volume of 3 to 16 pico liters and a density of 5 to 610 per 1 mm$^2$ showed excellent coating film adhesion and a wide range of controllable glossiness.

In particular, it was confirmed that when the protrusion had a volume of 3 to 5 pico liters and a density of 57 to 608 per 1 mm$^2$, the range of controllable glossiness was wider. It was found that Examples 1 to 10 in which the protrusion had a volume of 3 pico liters could control the glossiness from a minimum of 91 to a maximum of 145, and Examples 11 to 14 in which the protrusion had a volume of 5 pico liters, the glossiness could be controlled from a minimum of 95 to a maximum of 142.

Meanwhile, it was found that Examples 15 to 19 in which the protrusion had a volume of 13 pico liters could control the glossiness from a minimum of 108 to a maximum of 128, and Examples 20 to 24 in which the protrusion had a volume of 16 pico liters, the glossiness could be controlled from a minimum of 110 to a maximum of 126. That is, it was found that the wide range of glossiness was easily controllable as the volume of the protrusion was small, and in particular, when the volume of the protrusion was 3 to 5 pico liters, the glossiness was most easily controllable.

On the other hand, it was confirmed that Comparative Examples 2 to 10 not satisfying the protrusion having a volume of 3 to 16 pico liters and a density of 5 to 610 per 1 mm$^2$ had similar glossiness to that of Comparative Example 1 in which no coating layer was formed, and did not show a quenching effect.

Figure 2:
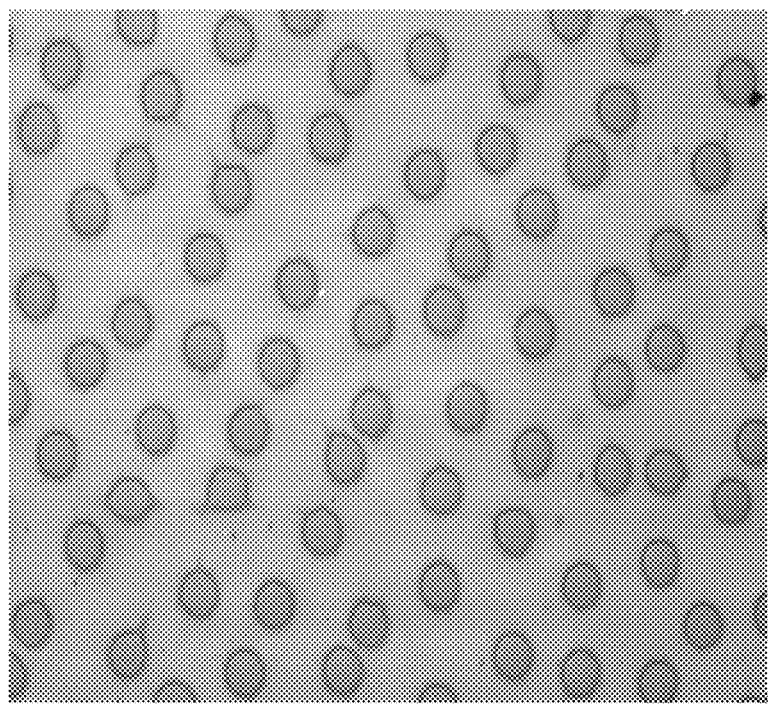
FIG. 2 is an image showing a coating layer of the surface-treated metallic material according to an exemplary embodiment in the present disclosure.

FIG. 2 is an image showing the coating layer of the surface-treated metallic material according to an exemplary embodiment in the present disclosure, wherein it was confirmed that the coating layer having the plurality of protrusions was formed on an upper part of the metallic material.

COMPARATIVE EXAMPLE

An ultraviolet curable paint including 20 wt % of a 6-functional polyester acrylate oligomer, 25 wt % of a bifunctional urethane acrylate oligomer, 20 wt % of tetrahydrofurfuryl acrylate (THFA), and 5 wt % of RUNTE-CURE 1103, 30 wt % of isobonyl acrylate and silica as a quencher was prepared, and then a coating layer was formed on an upper part of a stainless steel sheet by a roll coating method. The coating layer was ultraviolet cured for 30 seconds, then a glossiness was measured by a gloss meter based on 60 degrees, and a coating film adhesion was tested. A content, an average particle diameter, coating film adhesion, and glossiness of the silica are shown in Table 2 below.

TABLE 2

| | Silica content (wt %) | Silica average particle diameter (μm) | Coating film adhesion | Glossiness (Based on 60 degrees) |
|---|---|---|---|---|
| Comparative Example 11 | 0 | — | ◎ | 157 |
| Comparative Example 12 | 0 | — | ◎ | 154 |
| Comparative Example 13 | 0 | — | ◎ | 161 |
| Comparative Example 14 | 0 | — | ◎ | 158 |
| Comparative Example 15 | 1 | 2 | ◎ | 148 |
| Comparative Example 16 | 1 | 2 | ◎ | 150 |
| Comparative Example 17 | 1 | 2 | ◎ | 150 |
| Comparative Example 18 | 1 | 8 | ○ | 89 |
| Comparative Example 19 | 1 | 8 | ○ | 92 |
| Comparative Example 20 | 1 | 8 | ◎ | 92 |
| Comparative Example 21 | 2 | 2 | ◎ | 145 |
| Comparative Example 22 | 2 | 2 | ◎ | 147 |
| Comparative Example 23 | 2 | 8 | ○ | 91 |
| Comparative Example 24 | 2 | 8 | ◎ | 89 |
| Comparative Example 25 | 4 | 2 | ◎ | 148 |
| Comparative Example 26 | 4 | 8 | ◎ | 92 |
| Comparative Example 27 | 10 | 2 | X | 41 |
| Comparative Example 28 | 10 | 5 | X | 43 |
| Comparative Example 29 | 10 | 8 | X | 43 |

As shown in Table 2, it was confirmed that the glossiness could be controlled by adjusting the silica content and the average particle diameter, but Comparative Examples 27 to 29 had very low coating film adhesion. In other words, since the silica content and the average particle diameter are factors affecting basic physical properties of the coating layer, it was confirmed that when the coating layer was formed with the ultraviolet curable coating composition including silica, a quencher, deviations in physical properties of the surface-treated metallic material were large.

While exemplary embodiments of the present disclosure have been shown and described above, it will be apparent to those skilled in the art that modifications and variations could be made without departing from the scope of the present disclosure as defined by the appended claims.

The invention claimed is:

1. A surface-treated metallic material having ease of glossiness control comprising:
    a metallic material; and
    a coating layer, formed on a surface of the metallic material and on which an ultraviolet curable coating composition is cured,
    wherein the coating layer comprises: a plurality of protrusions,
    each of the protrusions has a volume of 3 to 16 pico liters, and
    the protrusions are arranged at a density of 5 to 610 per 1 $mm^2$ of the surface of the metallic material.

2. The surface-treated metallic material having ease of glossiness control of claim 1, wherein the ultraviolet curable coating composition includes 40 to 70 wt % of an oligomer, 20 to 59 wt % of a photopolymerizable monomer, and 1 to 10 wt % of a photoinitiator.

3. The surface-treated metallic material having ease of glossiness control of claim 2, wherein the oligomer is at least one selected from the group consisting of urethane acrylate, epoxy acrylate, and polyester acrylate.

4. The surface-treated metallic material having ease of glossiness control of claim 1, wherein the metallic material is one selected from the group consisting of a cold-rolled steel sheet, a hot-dip galvanized steel sheet, an electronic galvanized sheet steel, an aluminum-plated steel sheet, an aluminum alloy-plated steel sheet, a stainless steel sheet, an aluminum sheet, a magnesium sheet, a zinc sheet, and a titanium zinc sheet.

5. A method for manufacturing a surface-treated metallic material having ease of glossiness control, the method comprising:
    forming a coating layer comprising: a plurality of protrusions by spraying an ultraviolet curable coating composition onto a surface of a metallic material in the form of droplets,
    wherein each of the protrusions has a volume of 3 to 16 pico liters, and the protrusions are arranged at a density of 5 to 610 per 1 $mm^2$ of the surface of the metallic material.

6. The method of claim 5, further comprising:
    performing ultraviolet curing on the coating layer.

7. The method of claim 6, wherein the ultraviolet curing is performed for 0.1 to 60 seconds.

8. The method of claim 5, wherein the spraying is performed using at least one selected from the group consisting of an inkjet head, a spray gun, and an ultrasonic jetting device.

9. The method of claim 5, wherein the ultraviolet curable coating composition includes 40 to 70 wt % of an oligomer, 20 to 59 wt % of a photopolymerizable monomer, and 1 to 10 wt % of a photoinitiator.

10. The method of claim 5, wherein the metallic material is one selected from the group consisting of a cold-rolled steel sheet, a hot-dip galvanized steel sheet, an electronic galvanized sheet steel, an aluminum-plated steel sheet, an aluminum alloy-plated steel sheet, a stainless steel sheet, an aluminum sheet, a magnesium sheet, a zinc sheet, and a titanium zinc sheet.

* * * * *